United States Patent [19]
Restelli

[11] 3,712,692
[45] Jan. 23, 1973

[54] WELDED RETAINER FOR AN ANTIFRICTION BEARING

[75] Inventor: Ronald E. Restelli, Cromwell, Conn.

[73] Assignee: Textron Inc., Providence, R.I.

[22] Filed: Jan. 18, 1971

[21] Appl. No.: 107,071

[52] U.S. Cl. ..............................................308/217
[51] Int. Cl. ............................................F16c 33/46
[58] Field of Search............................308/201, 217

[56] References Cited

UNITED STATES PATENTS

| | | | |
|---|---|---|---|
| 3,075,278 | 1/1963 | Bratt | 308/217 |
| 3,087,762 | 4/1963 | Gothberg | 308/217 |
| 3,471,208 | 10/1969 | Vannest | 308/201 |

Primary Examiner—Milton Kaufman
Assistant Examiner—Frank Susko
Attorney—Sandoe, Hopgood & Calimafde

[57] ABSTRACT

The invention contemplates a bearing retainer of the variety involving axially split mating ring elements or halves, in which pockets for holding individual antifriction elements are defined by matched recesses in each ring element, with abutting bridge formations between adjacent pockets. Axial bores at bridge locations receive locating rods which extend substantially the full axial length of the retainer. The rod ends are fusion-welded to adjacent bore material in such manner as to retain a compressionally loaded unison of the two mated ring elements or halves. The nature of the process is to permit retainer assembly as the final step of assembling the full bearing, complete with antifriction elements in grooved raceways, without danger to the operative bearing parts.

6 Claims, 4 Drawing Figures

PATENTED JAN 23 1973
3,712,692
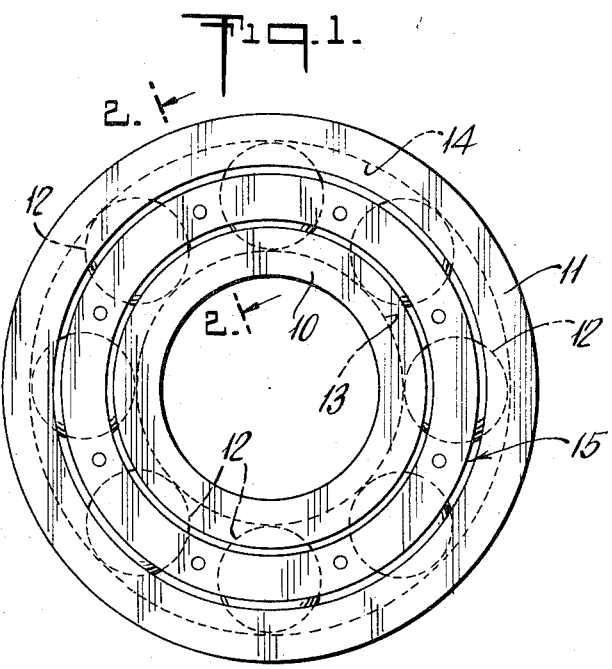
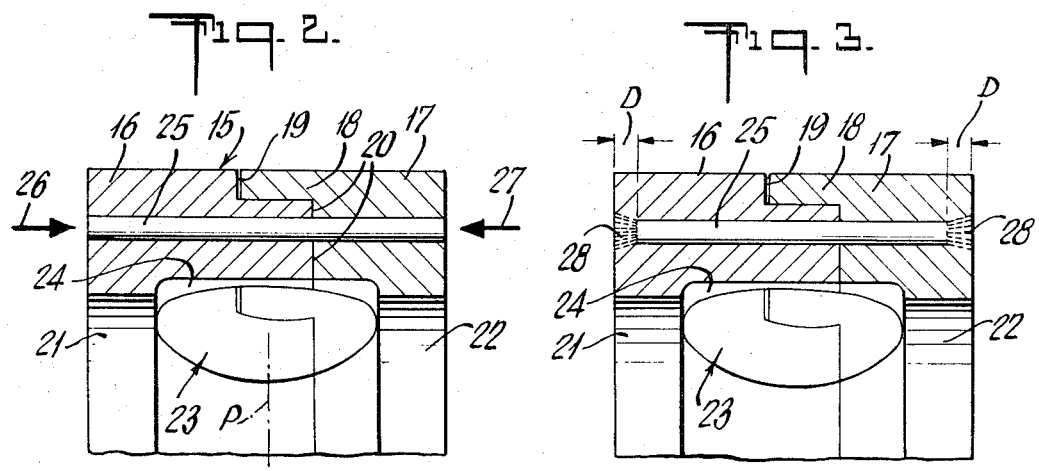
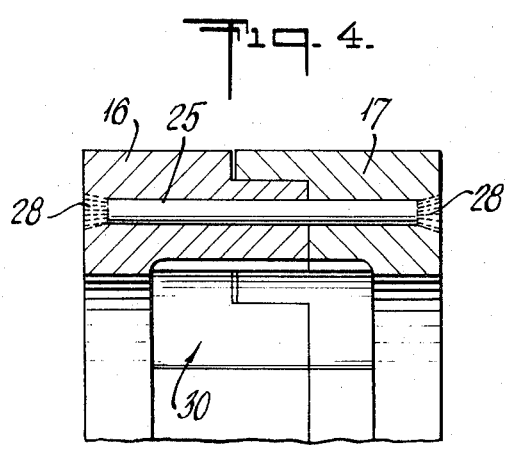
INVENTOR
RONALD E. RESTELLI
BY
Sandoe, Hopgood & Calimafde
ATTORNEYS

WELDED RETAINER FOR AN ANTIFRICTION BEARING

This invention relates to a retainer for antifriction elements in a bearing, particularly in such bearings wherein the opposed raceways of inner and outer bearing rings are defined between axially spaced side walls. Such bearings include deep-groove bearings, wherein retainer assembly to the antifriction elements is possible only after preliminary assembly of the antifriction elements to the bearing rings in abutting adjacency, prior to angular spreading for retention by the retainer ring.

Existing and past techniques for assembling retainers of the character indicated have relied upon axially matched ring elements which are held together by cold-riveting. For best results, this technique requires selectively matching rivet-body diameter to the diameter of holes drilled through both ring elements. Rivet length must then be developed to insure correct head formation. Consequences of incorrect assembly are distorted retainer surfaces, buckled rivets, slack or excessive head fill-out, any one of which can mean poor or inadequate joint strength. Also, the rivet itself, being relatively readily deformable, is inherently susceptible to loosening its hold, or joint-retention, in the presence of undue stress or vibration.

It is, accordingly, an object of the invention to provide an improved retainer construction of the character indicated, avoiding the above-noted deficiencies.

Another object is to provide an improved method of making a retainer of the character indicated and, if need be, for assembling the same as the final step of assembling the antifriction bearing which it is to serve.

A specific object is to achieve the foregoing objects with a construction in which no impacting is necessary to complete assembly and in which stronger materials can be used.

Another specific object is to achieve an assembly which inherently and permanently compressionally loads the mating ring elements of the retainer.

A general object is to achieve inherently greater joint strength, with simpler structure, and inherently affording less stringent tolerances than in past retainer constructions.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIG. 1 is an end elevation of an antifriction bearing in accordance with the invention;

FIG. 2 is an enlarged simplified sectional view at the plane 2—2 of FIG. 1, to illustrate an assembly step;

FIG. 3 is a view similar to FIG. 2 to illustrate completion of another step; and FIG. 4 is a view similar to FIG. 3 to illustrate a modification.

Referring to FIG. 1, the invention is shown in application to an antifriction bearing comprising inner and outer bearing rings 10–11 with interposed antifriction elements 12. The elements 12 ride raceways 13–14 in the respective bearing rings. These raceways may be of the so-called deep-groove variety, i.e., they may be located between axially spaced sidewalls or shoulders; hence, the dashed-line showing of the respective raceways in FIG. 1. A retainer ring 15 holds the antifriction elements in angularly spaced relation, as shown.

In FIG. 2, the retainer ring 15 is seen to comprise the axially mated assembly of two metal retainer-ring elements or halves 16–17. Coaxial registry is assured by interfitting axial-flange and axial-recess formations 18–19 near the radially outer limits of the halves 16–17. The axial depth of recess 19 exceeds the axial length of flange 18, so that remaining adjacent body walls of ring halves 16–17 may directly abut, at the region 20; region 20 is preferably of greater radial extent than that of the fit at 18–19. Each of the retainer halves 16–17 is shown with a radial inward flange, finished to define lands 21–22 for stabilized piloting of the retainer on the adjacent sidewall or shoulder surfaces of the inner ring 10, as will be understood. Between the lands 21–22, plural pockets 23 at equal angular spacing loosely accommodate and space the respective antifriction elements; for the case of FIG. 2, the antifriction elements (not shown) are balls, and the pockets are generally cylindrical on spaced radially directed axes. Each of the ring halves 16–17 is arcuately recessed to define mating halves of all pockets 23; and the radical region 20 is (a) preferably axially offset from the central plane P of ball centers and is (b) also preferably of radial extent to straddle the circular locus of ball centers.

With pockets 23 as thus defined, the ring elements or halves 16–17 mate at bridges 24 between pockets. Axially extending bores are drilled through the bridge regions, to permit inserted assembly of rods, as at 25, sized to fit each such axial bore and to extend substantially the full axial extent of the bore; in the form shown, this axial extent is also the full axial extent of the retainer 15. The assembly is made permanent by fusion-welding the outer periphery of each rod end to the adjacent bore material of the particular ring half 16 (17). In FIG. 2, this step is suggested by the respective heavy arrows 26–27, directed at the respective rod-end regions. The product of such welding of the ends of rod 25 is shown in FIG. 3, wherein the fused regions 28 are seen to extend to a substantial penetration or depth D.

The rod 25 may be of rivet material, or it may be a suitably cut length of wire; alternatively, it may be an ESNA "Rollpin" or of needle-roller stock. The energized beam 26 (27) may be the output of a laser, but it is preferably a beam of electrons. In either event, the relatively great heat-sinking property of the retainer half 16 (17), as compared with that of the rod 25, means that the differential expansion during heating (for fusion) will favor the rod 25. Thus, if the halves 16–17 are clamped during the fusion-welding process, the rod 25 will elongate predominantly as long as heat is applied or generated at a region 28; after fusion of the second end of rod 25 (and upon de-energizing or removing the beam 26 or 27, as the case may be), cooling to ambient involves greatest shrinkage in the rod 25, so that rods 25 remain in tension to compressionally load the mated relation of the retainer halves 16–17.

In assembling the bearing of FIG. 1, the inner and outer bearing rings 10–11 are first eccentrically positioned, to provide a crescent opening within which all required balls are inserted, in abutting adjacency, into the raceways. The balls are then spread to permit application of, say, ring half 16 between rings 10–11 and in ball-spacing relation with the respective pocket recesses of ring half 16. The other ring half 17 is then applied to the other side of the assembly into mating abutment with the ring half 16. Rods 15 are inserted as necessary; the retainer halves are clamped, and the described fusion-welding step performed. Upon releasing the clamp, the rods 25 will have assumed the clamping role, and the bearing assembly is complete.

FIG. 4 illustrates the same procedure in a roller-bearing application, where the pockets 30 are of different cross-section, appropriate to the roller geometry. For example, for cylindrical rolls, the pocket cross-section is generally rectangular, and the raceways 13–14 are cylindrical. Assembly and fusion-welding are otherwise as already described.

It will be seen that the invention achieves all the stated objects. Specifically, a superior joint is produced, with vastly greater assurance of longevity, however heavy the use of the bearing. There is no impacting of the retainer body or of the rod, thus widening the tolerance permissible in selecting rod diameter to match the drilled-hole diameter. There is no need to closely control the length of the rivet, because there is no problem of head fill-out. There is no tendency to bulge even a thin-walled retainer section. Production yields are increased, through consistently repeatable assembly. Cost savings result from use of standard wire. Greater strength results from extensive metallurgical bonding, circumferentially around and axially inward of the rod ends. A flush side face is achieved without requiring counterbores, and there is no need to reduce the retainer width to allow for rivet-head protrusion; thus, when desired, retainer width may be increased without exceeding the outer tolerable confines of retainers for particular bearing sizes.

While the invention has been described in detail for preferred forms and methods, it will be understood that modifications may be made. For example, the rods 25 may first be sub-assembled and fused to one retainer half (e.g., 16), so as to project for entry into the drilled holes of the other half after assembly to the bearing, thus requiring fusion-welding at only one axial end, after assembly to the bearing. Still further alternatively, the rods 25 may be headed rivets, inserted through the drilled holes of one retainer half 16, and projected through the drilled holes of the other retainer half 17 into substantially flush relation with the outer end face of the latter, assembly being completed by fusion-welding the rivet ends in such flush relation.

What is claimed is:

1. An antifriction bearing comprising radially spaced inner and outer bearing rings having grooved raceways in radially opposed relation, plural antifriction elements in substantially equal angularly spaced relation and riding said raceways, and a retainer ring having antifriction-element pockets extending radially through said retainer ring at equal angular spacings; said retainer ring comprising two ring-element halves which separably mate in axial end-to-end relation, said pockets each being defined by mating opposed recesses in each of said halves, said halves abutting at bridge portions between pockets, a cylindrical bore axially through both ring halves at each of a plurality of said bridge portions, and a metal rod in each bore, said rods being of diameter to fit and maintain alignment of the separate halves of said bores and of length substantially that of the overall axial extent of said retainer ring, each rod end having a substantial axial portion of its peripheral side fused to the wall of the bore to form an integral part of the retainer ring, the fused regions being limited to axially outer ends of said rods, and each rod being tensed between its fused ends, thereby compressionally holding the ring-element halves in mated relation.

2. The bearing of claim 1, wherein circumferential overlapped axial flange and recess formations on the mating axial ends of said ring-element halves retain said halves on a common central axis, and wherein said flange and recess formations are relatively thin and at the radially outer limit of said halves, the flange formation projecting to lesser axial extent than the axial depth of its corresponding recess, and said bores pass through the remainder of the adjacent ends of said halves, whereby the remainder of the adjacent ends of said halves is relied upon for compressionally loaded mating abutment, with compressional loading in alignment with said abutment.

3. An antifriction bearing comprising radially spaced inner and outer bearing rings having grooved raceways in radially opposed relation, plural antifriction elements in substantially equal angularly spaced relation and riding said raceways, thereby defining a circular locus of centers of said elements, and a retainer ring having antifriction-element pockets extending radially through said retainer ring at equal angular spacings; said retainer ring comprising two ring-element halves having adjacent formations which telescopically mate in axial end-to-end relation, said pockets each being defined by mating opposed recesses in each of said halves, said halves abutting at bridge portions between pockets, the bridge portions of one of said halves having continuous pocket-forming surfaces which intersect and radially overlap said locus, a cylindrical bore axially through both ring halves at each of a plurality of said bridge portions, and a metal rod in each bore, said rods being of diameter to fit and maintain alignment of the separate halves of said bores and of length substantially that of the overall axial extent of said retainer ring, each rod end having a substantial axial portion of its peripheral side fused to the wall of its bore to form an integral part of the retainer ring, the fused regions being limited to axially outer ends of said rods, and each rod being tensed between its fused ends, thereby compressionally holding the ring-element halves in mated relation.

4. The bearing of claim 3, wherein said antifriction elements are balls and wherein said pocket-forming surfaces of said one half also axially overlap said locus.

5. A retainer ring for an antifriction bearing, comprising an annulus defined by two circumferentially continuous halves in telescopically mated interfitting axial adjacency, said ring having a plurality of angularly spaced antifriction-element pockets extending radially through said ring and in the region of telescopic interfit, thereby defining bridge portions at which said halves interfit, the bridge portions of one of said halves having continuous pocket-forming surfaces which extend from the radially inner ends of said pockets to an outer location near the radially outer ends of said pockets, a cylindrical bore axially through both ring halves at each of a plurality of said bridge portions, and a metal rod in each bore, said rods being of diameter to fit and maintain alignment of the separate halves of said bores and of length substantially that of the overall axial extent of said retainer ring, each rod having a substantial axial portion of its peripheral side fused to the wall of its bore to form an integral part of the retainer ring, the fused regions being limited to axially outer ends of said rods, and each rod being tensed between its fused ends, thereby compressionally holding the ring halves in mated relation.

6. A ring according to claim 5, wherein said pockets are cylindrical on angularly spaced radially outwardly extending axes and in a common radial plane, and wherein said pocket-forming surfaces of said one half intersect and overlap said plane, whereby balls in an assembled ball bearing are angularly located only by contact with the pocket-forming surfaces of said one half.

* * * * *